Feb. 22, 1966  W. F. WILSON  3,235,984
EARTH MOVING VEHICLE
Filed Dec. 15, 1960  5 Sheets-Sheet 3
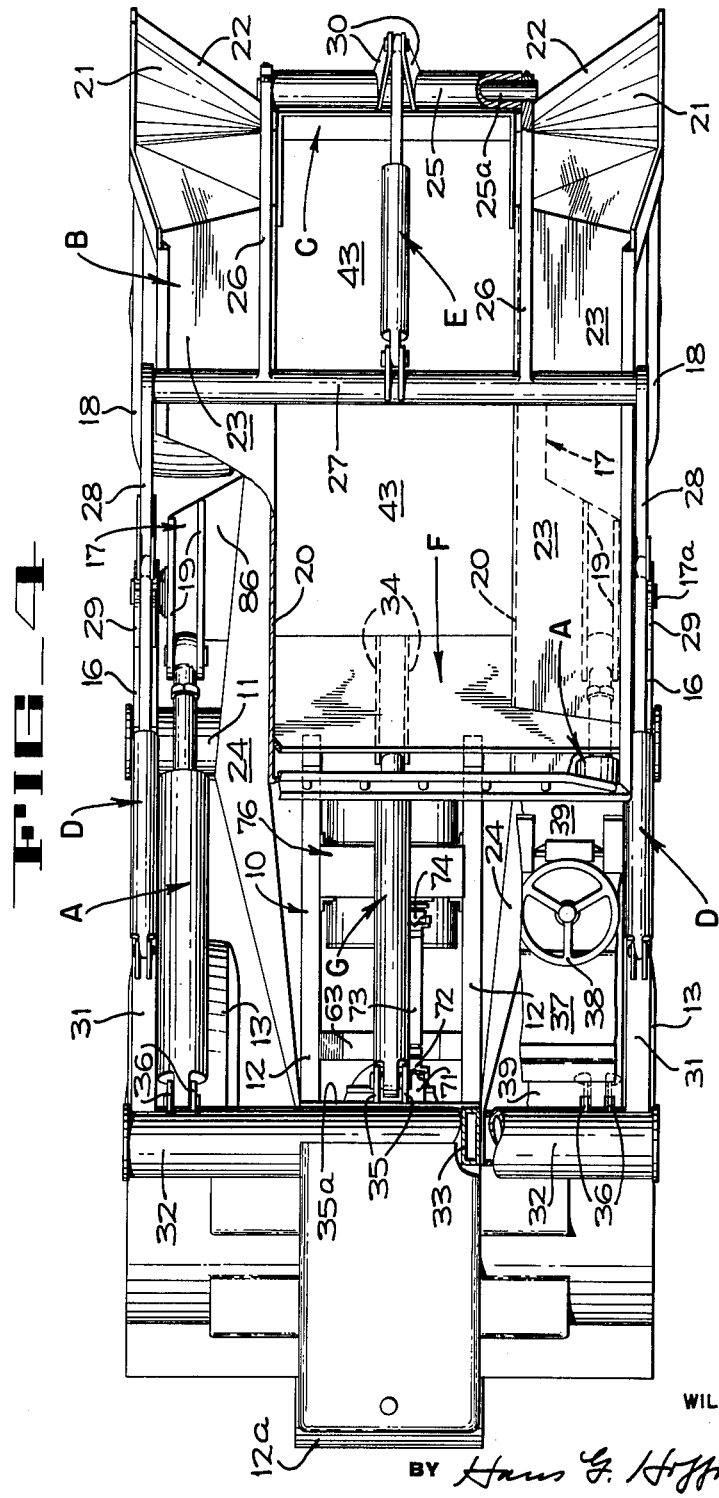
INVENTOR
WILLIAM F. WILSON
BY Hans G. Hoffmeister
ATTORNEY

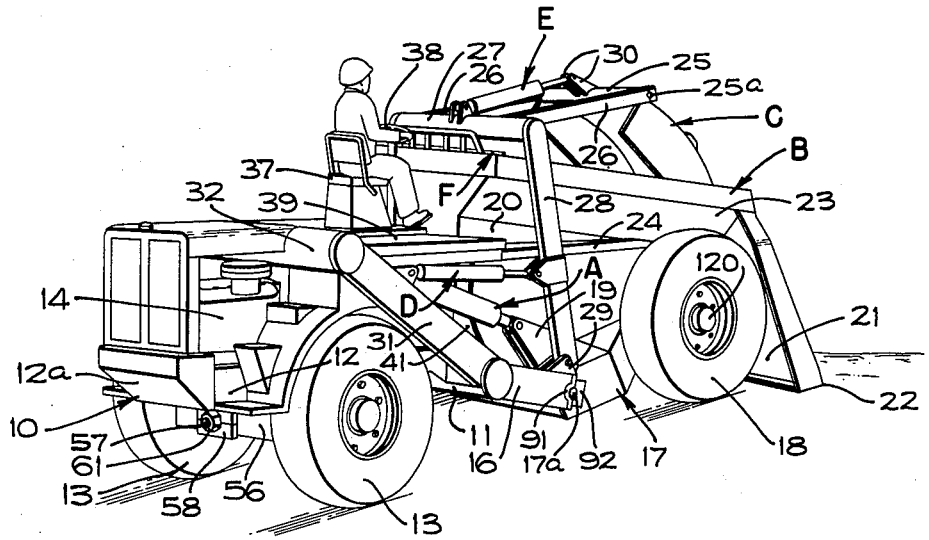

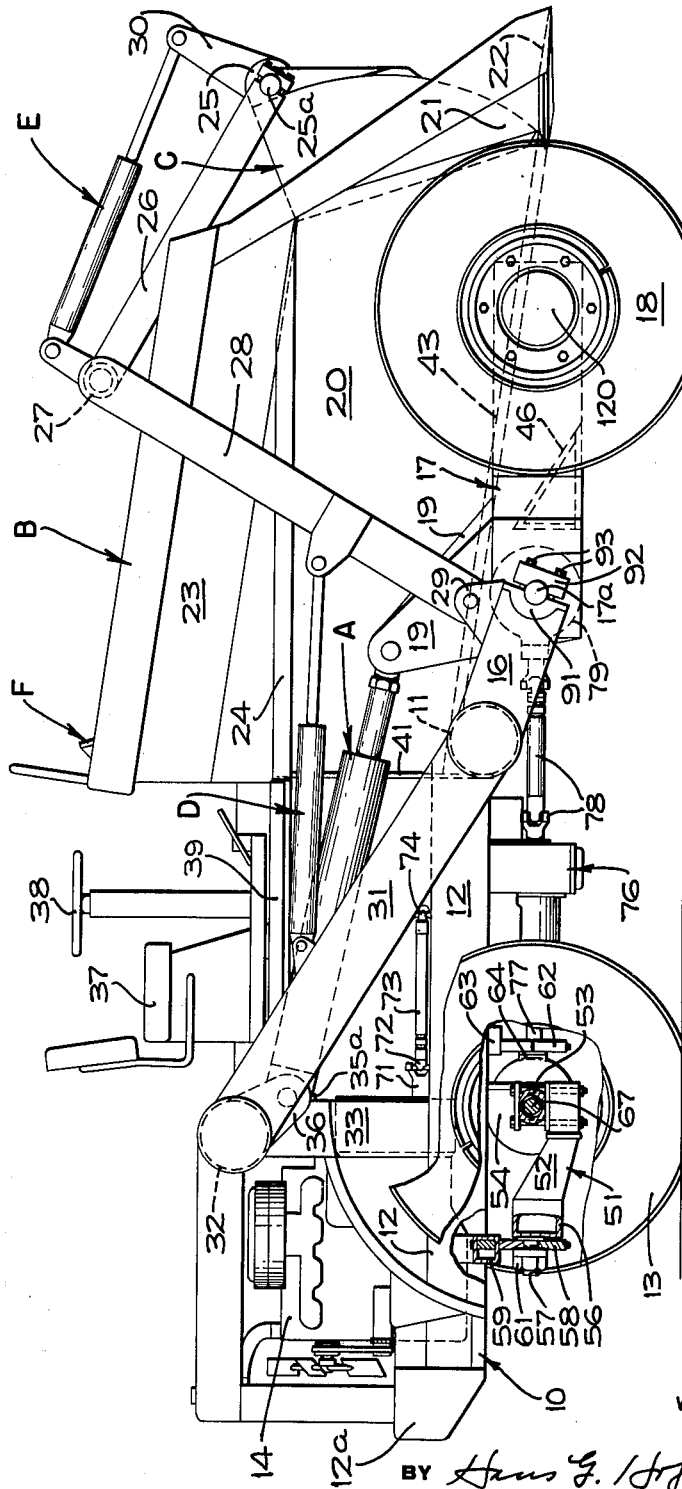

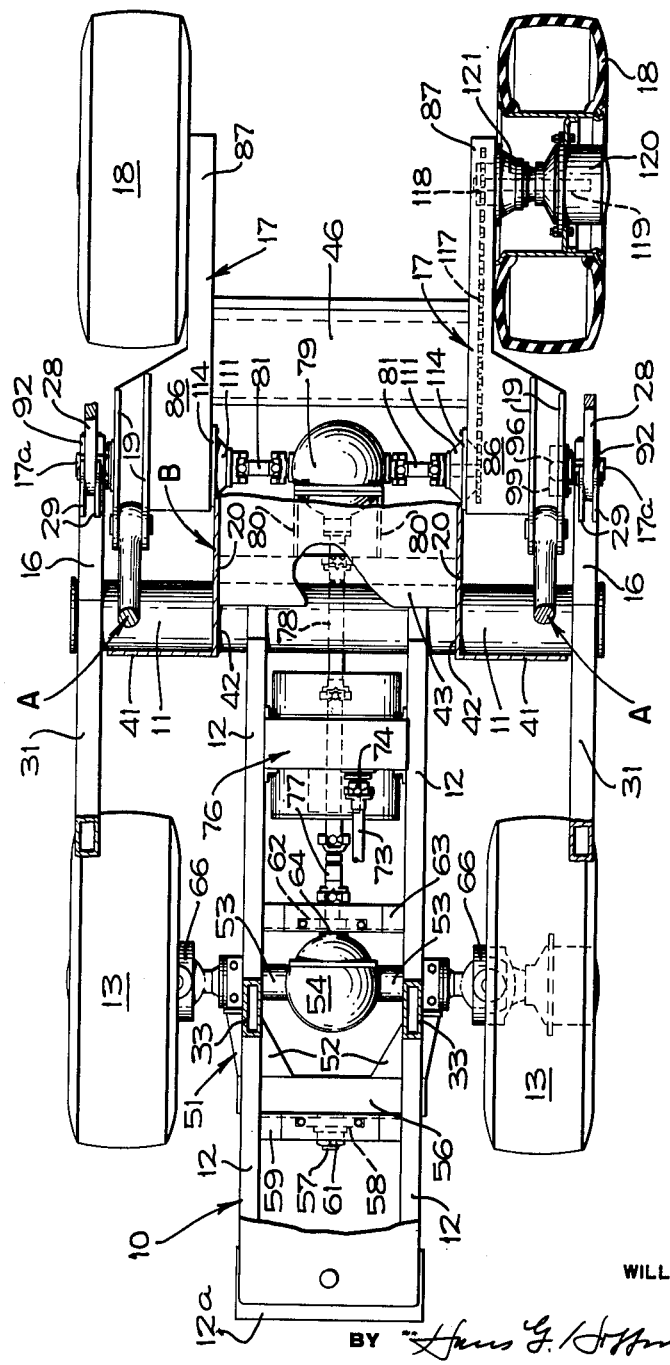

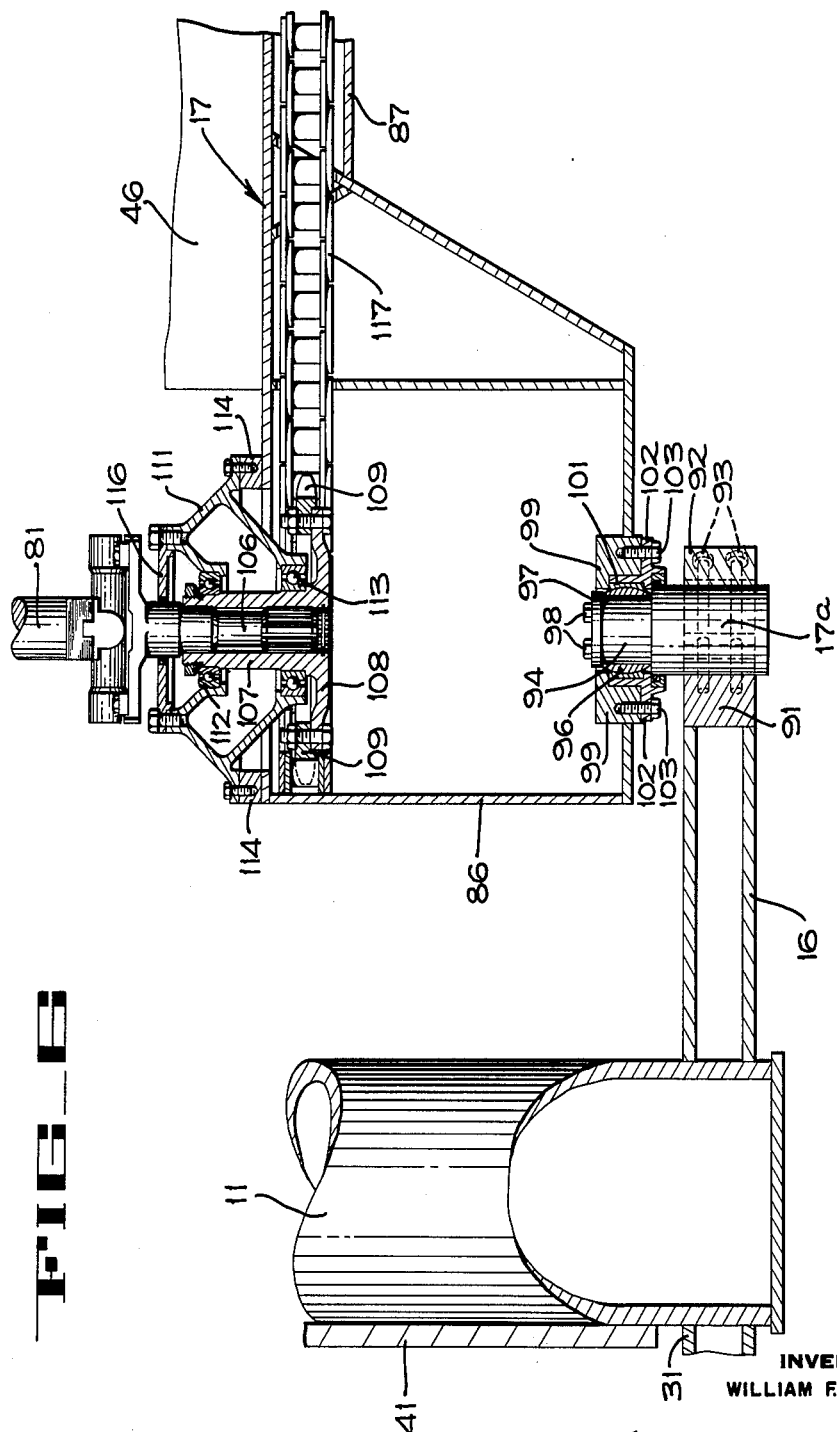

United States Patent Office 3,235,984
Patented Feb. 22, 1966

3,235,984
EARTH MOVING VEHICLE
William F. Wilson, San Jose, Calif., assignor, by mesne assignments, to Erhard Lauster, Stuttgart-Bad Cannstatt, Germany
Filed Dec. 15, 1960, Ser. No. 76,035
22 Claims. (Cl. 37—126)

This invention relates to apparatus for scraping, excavating, loading, hauling, and unloading earth, gravel and other materials, and particularly relates to self-powered vehicles adapted to be driven over the terrain and operable to perform these functions.

Vehicles of the type to which this invention relates include a chassis or frame, a rear engine, rear steerable wheels which may be driven, front traction wheels, and a box for carrying earth and other materials. The box is rigidly mounted on the frame and is provided with a scraping blade at the forward end thereof. A power operated loading claw is mounted on the frame to assist in transferring earth into the box. The vehicle also includes an earth ejector plate normally disposed at the rear of the box. In accordance with the present invention, the front wheels, which are driven, are mounted on forwardly extended pivoted arms so that the box may be raised or lowered to adjust the height of the blade.

An object of the invention is to provide for unloading the box of a vehicle of the type described directly into a dump truck or other highway carrier while the box is in an elevated position. This is accomplished, in accordance with the invention, by pivoting the front wheel-supporting arms to a substantially vertical position, and by proportioning the length of the wheel-supporting arms relative to the wheel base of the vehicle so that, when the arms are in a substantially vertical position, the blade of the box will clear the body of a dump truck.

Another object of the invention is to provide a strong and rigid mounting for the wheel supporting arms without sacrificing box capacity. It has been found that, if the wheel supporting arms are mounted directly on the sides of the box, such mounting can not be made sufficiently strong unless the sides of the box are unduly thickened or reinforced. Such reinforcing would add considerable weight to the vehicle, would increase the cost of the vehicle, and would reduce the capacity of the box. In the present invention a sturdy and rigid mounting for the wheel supporting arm is provided by structure wherein such arms are mounted directly on strong, rigid frame elements of the vehicle.

The front wheels of a vehicle of the type referred to support a major portion of the load in the box and, accordingly, if the wheels are pivotally mounted, an unbalanced load within the box results in an unbalanced load on the wheels and on the arms upon which they are mounted. Thus, if an inexpensive and simple hydraulic system is employed for raising and lowering the independently movable wheel supporting arms, that is, a system wherein the hydraulic pressure is divided between operating cylinders for each arm, an unbalanced load will result in unequal pivotal motion of the arms. This can be partially corrected by expensive and complicated hydraulic systems that isolate the hydraulic elements for each wheel supporting arm, but, in a wheel mounting that is constructed in accordance with the present invention, such systems are unnecessary. Accordingly, another object of the invention is to provide a mounting for the wheel supporting arms on the frame such that the wheel supporting arms can be cross connected by a rigid brace member so that they necessarily have simultaneous pivotal motion, the mounting and cross connection of the arms being arranged to provide no interference with the box. This arrangement not only provides a very sturdy wheel mounting but also makes possible the use of a simple, divided flow hydraulic system for operating the pivoted wheel mounting arms.

Another object of the invention is to provide means for driving the front wheels through the wheel supporting arms without structurally weakening either the frame or the mounting structure for the arms.

Still another object of the invention is to accommodate for slight mis-alignment of the respective mountings for wheel supporting arms, without interfering with the driving connections to the front wheels. This is accomplished by a structure that renders the driving connections to the pivoted arms completely independent of the pivots that mount the arms on the frame, and by providing ball joints at the pivots.

Another object of the invention is to provide a rigid, sturdy mounting for the hydraulic cylinder assemblies that control the raising and lowering of the wheel supporting arms.

Further objects of the invention are to provide excellent maneuverability of the vehicle during the unloading operation; to make possible precise control of the rate of material discharge during unloading; and to provide for the establishment of a new footing for the front drive wheels in case they spin or become mired.

Other and further objects of the invention will become apparent from the following detailed description of the invention and the accompanying drawings.

In the drawings:

FIG. 1 is a perspective of the vehicle of the invention with the material-receiving box lowered to its scraping position.

FIG. 2 is a perspective of the vehicle with the box raised sufficiently to permit unloading of the box directly into a dump truck.

FIG. 3 is a side elevation of the vehicle with the box raised to its carry position.

FIG. 4 is a plan view of the vehicle, with portions of the driver's seat, the platform, and the box removed.

FIG. 5 is a plan view of the frame of the vehicle showing the drive train, with the engine, box and other parts removed.

FIG. 6 is an enlarged fragmentary section showing the pivotal mounting and drive connections for one of the front wheel supporting arms.

The major components and general arrangement of the vehicle will first be described. Referring to FIGS. 1–4, the vehicle includes a frame, indicated generally at 10, having a main member 11 in the form of a rigid laterally extending tube. Longitudinal frame members 12 extend rearwardly from the tube 11 on each side of the vehicle, and their rearward ends are joined by a rear cross frame member 12a. Steerable rear wheels 13 are mounted on the longitudinal frame members, said wheels being driven through a conventional universal joint assembly. An engine 14 is mounted on the longitudinal frame members 12. Rigidly mounted at the ends of the tubular frame cross member 11 are outboard frame arms 16, which arms project forwardly at each side of the vehicle from their points of attachment to the cross member 11. The outboard frame arms 16 form part of the main frame in that functionally they are rigid projections of the main frame cross member 11. In order to mount the front wheels 18, wheel supporting arms 17 are pivotally mounted on the forward ends of the outboard frame arms 16 by means of pivot shafts 17a. The front wheels 18 are journalled on the forward ends of the wheel supporting arms 17, and the wheels are driven by mechanism to be described in detail presently.

To provide for raising and lowering the wheel supporting arms 17 to adjust the height of the frame above the ground, hydraulic cylinder assemblies A (FIGS. 3 and 4) are provided, there being one assembly A for each wheel supporting arm. The piston rod of each hydraulic cylinder A is connected to the associated wheel mounting arm 17 by means of a crank arm plate 19 projecting from the wheel arm, and the rearward end of each cylinder is connected to the frame structure by means to be described in detail presently.

A combined material carrying box and scraper B (FIG. 3) is mounted on the frame, the principal point of attachment of the box being to the tubular frame cross member 11. The box includes two side walls 20 (FIG. 4) from which extend front aprons 21 that flare laterally in front of the front wheels 18. The lower forward edge of the box is provided with a forward cutting blade 22. Extending rearwardly from the front aprons 21 are upper longitudinal side aprons 23, which are connected to and flare laterally from the upper edges of the side walls 20. Longitudinal braces 24 (FIG. 4) strengthen the sides of the box and form a box supporting connection between an upper portion of the box and a portion of the frame, to be described in more detail presently.

A loading claw C is provided, the claw being mounted on the vehicle for compound pivotal and fore and aft movement. The claw is mounted on a transverse tubular member 25 (FIG. 4) that pivots on a transverse rod 25a mounted on arms 26 which project forwardly from a tubular cross member 27. The tubular cross member 27 is fixed to the forward ends of two arms 28 which, as seen in FIG. 3, project upwardly and are pivotally mounted on the outboard frame arms 16 by means of ears 29. In order to pivot the claw, a hydraulic cylinder assembly E (FIG. 4) is connected between the tubular cross member 27 and crank arms 30 projecting upwardly from the tubular member 25 that supports the claw.

In order to cause fore and aft movement of the claw, a hydraulic cylinder assembly D (FIG. 3) is connected directly between each vertical arm 28 and a diagonally disposed frame member brace 31. Each brace 31 extends between the tubular frame cross member 11, previously described, and an upper tubular cross member 32. The latter tubular cross member is rigidly mounted on the frame by means of vertical posts 33 (FIGS. 3 and 4) that extend upwardly from the longitudinal frame members 12. This structure provides rigid mounting for the hydraulic cylinder assemblies.

The rigid frame structure just described also provides a rigid mounting for the rearward ends of hydraulic cylinder assemblies A which control the raising and lowering of the front wheel supporting arms. Referring to FIGS. 3 and 4, the rearward ends of these hydraulic cylinder assemblies are connected to ears 36 projecting from the tubular cross member 32.

Slidably mounted in the box B is an ejector plate F (FIG. 4) which is advanced and retracted by a hydraulic cylinder assembly G. This assembly is connected between a pair of gusset plates 34 on the rear side of ejector plate F, and a pair of ears 35 mounted on a transverse plate 35a connected to the vertical posts 33. In FIG. 4 the upper tubular cross member 32 has been broken away to show one of the vertical posts 33.

A driver's seat 37 is mounted adjacent the steering wheel 38, the seat being mounted on a platform 39 supported by the frame in any suitable manner. If desired, the seat may be mounted for pivotal motion about the axis of the steering wheel in order that the operator may face in any desired direction during operation of the vehicle. Details of the seat mounting do not form part of the invention and hence are not shown.

Additional details of the load-carrying box and its mounting will now be described. As seen in FIG. 4, the rearward ends of the longitudinal braces 24, previously described as extending along and stiffening the sides of the box, are connected to the vertical frame posts 33 to help support the load in the box. The major zone of attachment of the box B with the frame is indicated in FIGS. 3-5. The rearward ends of sidewalls 20 are welded to the tubular frame cross member 11 (FIG. 5), and laterally spaced vertical brace flanges 41 are secured to the rear edges of the sidewalls 20 and extend upwardly along them. The lower portions of vertical brace flanges 41 are welded to the frame cross member 11. The lower portion of the rear wall of the box is open, as indicated at 42 (FIG. 5) so that material that finds its way behind the ejector plate F will be pushed out the rear of the box upon retraction of the plate. The box has a bottom plate 43, reinforced with channel members (not shown), and as indicated in FIG. 3, the bottom of the box extends forwardly and downwardly from its zone of attachment to cross member 11. The bottom of the box is disposed above the pivot shafts 17a that mount the wheel arms 17.

In order to provide for simultaneous pivotal motion of the front wheel supporting arms 17, as seen in FIGS. 3 and 5, the front wheel supporting arms are cross connected by a rigid transverse cross brace 46 welded to the arms. The bottom 43 of the box clears the cross brace 46, even when the box is lowered to its scraping position.

The mounting of the rear, combined steering and driving wheels will now be described. As seen in FIGS. 3 and 5, the rear wheels 13 are mounted on a rigid axle that swings about a longitudinal pivot axis defined by a rear trunnion 57 and a forward trunnion 64. The axle includes a U-shaped strut member 51 having laterally spaced legs 52 that are bolted at their forward ends to tubular extensions 53 of the housing of a differential 54. A cross arm 56 (FIG. 3) joins the rearward ends of the strut legs 52 and mounts the rearwardly projecting trunnion 57. The trunnion is pivoted in a plate assembly 58 depending from a frame cross member 59 that is connected between the longitudinal frame members 12. A nut 61 is threaded on a threaded end portion of the trunnion 57 to hold the trunnion in its mounted position.

A forward pivotal mounting for the rear axle assembly is provided by a split carrier plate 62 that depends from a frame cross member 63 attached to frame members 12. An extension of the housing of the differential 54 forms the trunnion 64 that is pivotally mounted in split plate 62. The rear wheels 13 are driven and steered through conventional universal joint assemblies 66 (FIG. 5), the drive being by means of live axles 67 (FIG. 3) extending through the differential housing extensions 53.

The general arrangement of the vehicle chassis, the mounting of the box on the chassis, the claw and ejector plate, and the mounting of the various hydraulic control elements have been described. The relationship of certain key dimensions that enable a vehicle of a given size to perform its intended functions will now be given. Although the following dimensions are given by way of example only, they will illustrate relative proportions of parts that enable the vehicle to scrape, carry, and unload into a truck or onto a pile of materials without interference between the moving parts of the vehicle, and with the vehicle remaining in a stable condition. In the case of a vehicle having a wheelbase of 140 inches, tires with an outside diameter of approximately 5 feet, and a scraping blade that terminates approximately 54 inches in front of the front axles, the pivot shafts 17a for the front wheel supporting arms 17 will be approximately 81 inches forward of the rear axle, and the effective length of the front wheel supporting arms 17 will be approximately 58 inches. These dimensions will cause the blade to be raised about 10 feet above the ground in the unloading position incident to pivoting of the wheel supporting arms.

In the example given above, wherein vehicle stability and available blade lifts are correlated for optimum overall operation, the effective length of the front wheel supporting arms 17 is approximately 41 percent of the wheelbase, and the nominal tire diameter is approximately 43 percent of the wheel base.

In the unloading position, the vehicle wheelbase is reduced to about 75 percent of the normal, or "ride" wheelbase. This provides for excellent maneuverability when the box is elevated for dumping and yet, with a vehicle geometry such as that just described, the center of gravity of the vehicle, including the load in the box, remains between the wheels so that the vehicle is perfectly stable in its elevated position. The retraction of the front wheels also provides an overhang of the box that facilitates unloading into a truck body.

The drive train to the front wheel and various additional details of the front wheel mounting will now be explained. The drive train is best seen in FIGS. 3 and 5, the engine 14 not appearing in FIG. 5. Referring to FIG. 3, the output shaft 71 of the engine is connected to a universal joint 72 that drives a shaft 73 which is connected at its forward end to a second universal joint 74. The latter universal joint is connected to a transmission and clutch unit 76, which provides for the usual selective gear changes and permits clutching and de-clutching of the front and rear wheel drives. The usual output shaft (not shown) is also provided for driving a hydraulic pump or pumps for the various actuating cylinders. Details of the transmission and clutch assembly and of the hydraulic system and its controls do not form part of the invention, units and systems for these purposes being well known in the art.

In order to drive the rear wheels, a shaft and double universal joint assembly 77 (FIG. 5) extends rearwardly from the clutch and transmission unit 76 to the rear wheel differential 54. Similarly, in order to drive the front wheels, a shaft and double universal joint assembly 78 extends forwardly from the clutch and transmission unit 76 to a front wheel differential unit 79. The housing for differential unit 79 is mounted on the frame by means of plates 80 (FIG. 5) welded to the frame cross member 11. Extending laterally from the front wheel differential 79 are front wheel drive shaft and double universal joint assemblies 81 that connect to the front wheel supporting arms 17.

Details of the mounting for the front wheel supporting arms 17 and the drive connections for the front wheels appears in FIG. 6. The front wheel supporting arms are in the form of rigid, box-like members having a relatively wide rearward section 86, and a relatively narrow section 87 projecting forwardly therefrom for mounting the front wheels. The cross brace 46 that connects the arms 17 is welded thereto at the junction of the wide section 86 and the narrow section 87. The wide sections 86 of arms 17 are pivotally mounted on the vehicle frame in a manner which renders the pivotal mounting completely independent of the drive connection to the front wheels 18. As previously described, the outboard frame arms 16 are welded to and extend forwardly from the tubular frame cross member 11. At the forward ends of the outboard frame arms 16 are pillow blocks 91, and the stub shafts 17a, that form the pivots for the front wheel supporting arms 17, are firmly clamped against the pillow blocks by caps 92 and bolts 93.

As previously mentioned, means are provided to pivotally mount the front wheel supporting arms 17 on the outboard frame arms 16 in a manner that accommodates slight misalignment of the widely spaced pillow blocks 91 in the arms 16, and prevents binding of the wheel arms during operation and in situations where the loads are laterally unbalanced. Such means is in the form of a ball joint connection between the wheel supporting arms 17 and the stub shafts 17a. Referring to FIG. 6, the inboard ends of the stub shafts 17a are necked down at 94 to receive a hardened ball member 96. In order to clamp the ball member 96 firmly on the stub shaft 17a, a retaining plate 97 is fastened to the stub shaft by means of bolts 98, the ball member 96 projecting slightly beyond the necked down portion 94 of the stub shaft.

The stub shaft 17a and ball joint assemblies are pivotally mounted in the wide sections 86 of the front wheel supporting arms 17 by means of thickened collars 99 welded to the outer walls of sections 86. Hardened ball races 101 for the ball members 96 are retained in collars 99 by means of annular retainers 102 that are bolted to the collars 99 by bolts 103. During pivotal motion of the front wheel supporting arms, relative motion takes place between the ball members 96 and the hardened races 101.

The driving connections for the front wheels are also shown in FIG. 6. The drive shaft and universal joint assemblies 81 are connected to stub shafts 106 keyed to sleeves 107 that are integral with flanges 108. Each flange 108 mounts a sprocket 109. The sleeves 107 are rotatably mounted in box-like carriers 111 by means of bearings 112 and 113. The carriers 111 are bolted to reinforcing rings 114 welded to the inboard walls of wheel supporting arms 17. Shaft seal retaining plates 116 are bolted to the inner faces of the carriers 111. It will be noted that although the axes of the pivot stub shafts 17a and the driving stub shafts 106 are normally in alignment, the driving and pivotal mounting connections are mechanically independent of one another, and because of the universal joints in shaft assemblies 81, slight misalignment that occurs on assembly or due to strains on the parts in service, has no effect on the driving connections.

The drive to the front wheels is completed by chains 117 trained around the driving sprockets 109 and around driven sprockets 118 (FIG. 5) keyed to front wheel stub axles 119. The live axles 119 drive wheel hubs 120 that are journalled on front axle housings 121. The housings 121 are independently supported on the wheel supporting arms 17 to relieve the live axles 119 of all but driving loads. This construction is in accordance with conventional full floating axle practice.

The operation of the vehicle of this invention will now be described briefly. If it is desired to use the vehicle as a scraper, the box is lowered until the blade 22 enters the earth or other material to be scraped into the box. In the design illustrated, the box can be set to penetrate the earth to a depth of about four inches before the lowermost box position is reached. When the vehicle is being used as a scraper, the box panels 21 that flare in front of the front wheels 18 serve to cause the vehicle to cut its own track at the new level, beneath the original level of the earth or other terrain.

The claw C can be operated so as to partake of a compound motion so that earth scraped up by the blade 22 can be pulled up by the claw over a body of earth previously deposited in the forward portion of the box, and back to the rearward portion of the box. This compound claw action is made possible by the pivotal mounting of the rigidly connected claw mounting arms 26 and 28 on the vehicle frame plus the independent pivotal mounting of the claw on rod 25a at the forward ends of arms 26. By proper manipulation of the claw pivoting hydraulic cylinder assembly E, and the hydraulic cylinder assembly D that pivots the arms 28 on the vehicle frame, a number of compound motions of the claw can be produced. Furthermore, the claw can be set at the forward end of the box to act as a tail gate to retain dirt or other material in the box during a carrying phase of operation.

If it is decided to move the loaded vehicle a considerable distance, the box is set in the carry position of FIG. 3 with the claw serving as a tail gate. The box can now be driven along the highway or over the ground to the zone for unloading, which may be a waiting dump truck T, as shown in FIG. 2. If it is desired to empty the box into the dump truck, the hydraulic cylinders A are actuated to pivot the front wheel supporting arms 17 to a nearly vertical position as indicated in FIG. 2. The critical dimensions for a typical vehicle previously given in the body of this specification will be such that the blade 22 will now clear a typical dump truck T so that operation of the ejection plate F by the hydraulic cylinder G will unload the material from the box and move it directly into the dump truck. Thus, it will be seen that the vehicle in accordance with the invention is a universal earth moving vehicle in that a single vehicle can perform the duties or take the place of two or more vehicles of conventional but more specialized design.

From the foregoing detailed description of the invention it can be seen that the vehicle can scrape, load, haul, and unload either on the ground, or on top of a pile of material, or into a truck or other carrier. The pivotal mounting for the front wheels which is rigid and strong is made directly with the vehicle frame. The front wheel supporting arms are connected by a cross brace to increase the strength and rigidity of the structure and to make it possible to use a simple, economical hydraulic system for controlling the front wheel arms. The capacity of the box is not reduced by the chassis, frame and drive mechanism and the box is rigidly mounted on the frame. The front wheel supporting arms are pivotally mounted independently of the front wheel driving connections, and the mounting accommodates slight misalignment and strain of the parts. Also, the hydraulic cylinder assemblies that operate the front wheel supporting arms have a rigid and sturdy support on the vehicle frame.

Another advantage of the vehicle of the invention that results from the ability to unload the box directly into a truck using the ejector plate is that the upward inclination of the bottom of the box during unloading makes it possible for the operator to exercise complete control over the unloading rate. Instead of abruptly depositing the entire load into the truck body, a characteristic of the usual front loader, in the vehicle of this invention the upward inclination of the bottom of the box renders control of the rate of discharge, by manipulation of the ejector plate, a simple matter because the material will only be discharged from the box in response to advance position of the ejector plate. Thus, the material can be ejected in a steady stream without undue shock to the truck.

In addition to increasing the maneuverability of the vehicle in its elevated condition, the 75 percent reduction in vehicle wheelbase previously described provides another advantage. When soft footing is encountered, the front wheels may become mired or may spin so as to create a slippery footing directly under the wheels. Under these circumstances, the operator need only apply power to pivot the front wheel arms toward their elevated position. This withdraws the front wheels rearwardly and places them on a new footing.

The invention having thus been described, that which is desired to be protected by Letters Patent is:

1. An earth moving vehicle having a main frame and a carrier box fixedly mounted on the frame, the improvement comprising a pair of front wheel mounting arms, means for pivotally mounting said arms directly on the main frame, a cross brace connecting said arms for simultaneous pivotal movement, front wheels journalled on said arms, means for driving said front wheels, said driving means being supported on said front wheel mounting arms independently of the pivotal mounting of said arms on said frame, and power means for pivoting said front wheel mounting arms on said frame for raising said frame and box to a position wherein the forward portion of the box is at a height above the ground sufficient to unload said box into a truck body.

2. An earth moving vehicle comprising a main frame, rear steering wheels supporting said main frame, a power source mounted on said frame, front wheel supporting arms pivotally mounted on each side of said frame and extending forwardly from their points of pivotal attachment, traction wheels mounted on the forward outboard ends of said wheel supporting arms, drive shafts extending across said frame and extending to said wheel supporting arms, said shafts being aligned with the pivot axes of said wheel supporting arms, drive connections between said drive shafts and said front traction wheels, drive means connected between said power source and said drive shafts, a scraper box rigidly mounted on said main frame, said box having a forward cutting blade, a loading claw, means for pivotally mounting said loading claw on said main frame, power means for operating said loading claw, a material ejector plate in said box, means to advance and retract said plate, and power means to pivot said front wheel supporting arms on said frame for raising and lowering the scraper box and main frame relative to the ground, said front wheel supporting arms being movable to a substantially vertical position, the relation of the effective length of said wheel supporting arms to the wheel base of the vehicle being such that when said wheel supporting arms are in a substantially vertical position the bottom of said box is inclined upward from rear to front and is spaced above and projects forward of said traction wheels, said power means for said arms exerting a pivoting force on said arms to hold them in their substantially vertical position.

3. An earth-moving vehicle comprising a main frame, rear steering wheels supporting said main frame, a power source mounted on said main frame, front wheel supporting arms, pivot means mounting said arms on each side of said main frame with said arms extending forwardly from their points of pivotal attachment, traction wheels mounted on the forward outboard ends of said wheel supporting arms, a rigid cross brace connecting said wheel supporting arms for simultaneous pivotal movement, drive shafts mounted on said front wheel supporting arms and aligned with the pivot axes of said wheel supporting arms, said drive shafts being mounted on said wheel supporting arms independently of the mounting of said pivot means on the main frame, drive means between said drive shafts and said front traction wheels, drive gearing connected between said power source and said drive shafts, a scraper box rigidly mounted on said main frame, said box entending forwardly from its attachment to said frame with the bottom of said box being disposed above said cross brace, said box having a forward cutting blade, a loading claw, means for pivotally mounting said loading claw on said main frame, power means for operating said loading claw, a material ejector plate in said box, means to advance and retract said plate, and power means to pivot said front wheel supporting arms on said frame for raising and lowering the scraper box and frame assembly relative to the ground, said front wheel supporting arms being movable to substantially a vertical position in order to lift said blade to the height of a dump truck body for unloading said box, said power means being capable of exerting a pivoting force on said front wheel supporting arms with the latter in their substantially vertical position.

4. An earth-moving vehicle comprising a main frame, said main frame comprising a rigid cross member, longitudinal frame members extending rearwardly from said cross member, and an outboard frame arm rigidly mounted on and extending forwardly from each end of said cross member; steering wheels supporting said longitudinal frame members, a power source mounted on said longitudinal frame members, a front wheel supporting arm extending forwardly from the inboard side of the forward end of each outboard frame arm, pivot means mounting said front wheel supporting arms on said outboard frame arms, a rigid cross brace connecting said wheel supporting arms for simultaneous pivotal movement, traction wheels mounted on the forward outboard ends of said wheel supporting arms, drive shafts mounted on said front wheel supporting arms and aligned with the pivot axes of said wheel supporting arms, said drive shafts being mounted on said front wheel supporting arms independently of the mounting of said pivot means for the arms and extending inwardly of said arms, drive connections between said drive shafts and said front traction wheels, drive means connected between said power source and said drive shafts, a scraper box rigidly mounted on said frame cross member and having a cutting blade, said box extending forwardly from said cross member with the bottom of said box being disposed above said cross brace, and power means to pivot said front wheel supporting arms on said outboard frame arms for raising and lowering the scraper box and frame assembly relative to the ground.

5. An earth-moving vehicle comprising a main frame, said main frame comprising a rigid cross member, longitudinal frame members extending rearwardly from said cross member, and an outboard frame arm rigidly mounted on and extending forwardly from each end of said cross member; steering wheels supporting said longitudinal frame members, a power source mounted on said longitudinal frame members, stub shafts mounted rigidly on the ends of said outboard frame arms and extending inwardly therefrom, a front wheel supporting arm having a ball joint connection with each stub shaft and extending forwardly from each stub shaft, traction wheels mounted on the forward outboard ends of said wheel supporting arms, a cross brace rigidly connecting said front wheel supporting arms for simultaneous pivotal motion, drive shafts mounted on said front wheel supporting arms and aligned wtih said stub shafts, said drive shafts extending inwardly of said wheel supporting arms, drive connections between said drive shafts and said front traction wheels, drive means connected between said power source and said drive shafts, a scraper box rigidly mounted on said frame cross member and having a cutting blade, and power means to pivot said front wheel supporting arms on said outboard frame arms for raising and lowering the scraper box and frame assembly relative to the ground.

6. An earth-moving vehicle comprising a main frame, said main frame comprising a rigid cross member, longitudinal frame members extending rearwardly from said cross member, steering wheels supporting said longitudinal frame members, and an outboard frame arm rigidly mounted on and extending forwardly from each end of said cross member; a power source mounted on said longitudinal frame members, stub shafts mounted rigidly on the end of said outboard frame arms and extending inwardly therefrom, pivot balls on the inner ends of said stub shafts, a pair of front wheel supporting arms, a cross brace rigidly connecting said front wheel supporting arms for simultaneous pivotal motion, each wheel supporting arm having a rear relatively wide box-like portion with a narrow box-like portion extending forwardly from the inboard side of said rear portion, the outboard walls of said rear box-like portions having ball joint connections with said stub shafts, wheels mounted on the forward outboard ends of said wheel supporting arms drive shafts mounted on the inboard walls of said rear box-like portions of said front wheel supporting arms and aligned with said stub shafts, universal joints connected to said drive shafts inwardly of said wheel supporting arms, drive chain and sprocket connections between said drive shafts and said front traction wheels, drive means connected between said power source and said universal joints, a scraper box rigidly mounted on said frame cross member and having a cutting blade, and power means to pivot said front wheel supporting arms on said outboard frame arms for raising and lowering the scraper box and frame assembly relative to the ground.

7. An earth-moving vehicle comprising a main frame, said main frame including a rigid cross member, longitudinal frame members extending rearwardly from said cross member, and an outboard frame arm rigidly mounted on and extending forwardly from each end of said cross member; steering wheels supporting said longitudinal frame members, front wheel supporting arms pivotally mounted on and extending forwardly from the forward ends of said outboard frame arms, traction wheels mounted on the forward ends of said wheel supporting arms, means for driving said front wheels, a scraper box rigidly mounted on said frame, said box having a cutting blade, brace arms rigidly mounted on the outboard ends of said frame cross member and extending rearwardly and upwardly therefrom, supports for the rearward ends of said brace arms connected to said longitudinal frame members, and hydraulic cylinder assemblies connected between said brace arms and said front wheel supporting arms to pivot said wheel supporting arms on said outboard frame arms for raising and lowering the scraper box and frame assembly relative to the ground.

8. An earth moving vehicle comprising a main frame, said main frame comprising a rigid cross member, longitudinal frame members extending rearwardly from said cross member, and an outboard frame arm rigidly mounted on and extending forwardly from each end of said cross member; rear steering wheels supporting said longitudinal frame members, front wheel supporting arms pivotally mounted on and extending forwardly from the forward ends of said outboard frame arms, traction wheels mounted on the forward ends of said wheel supporting arms, a cross brace rigidly connecting said wheel supporting arms for simultaneous pivotal movement, means for driving said front wheels, a scraper box rigidly mounted on said main frame, said box having a cutting blade disposed forwardly of said front wheels, a loading claw, means for pivotally mounting said loading claw on said main frame, power means for operating said loading claw, a material ejector plate in said box, means to advance and retract said plate, and power means to pivot said front wheel supporting arms on said outboard frame arms for raising and lowering the scraper box and frame assembly relatively to the ground, the effective length of said front wheel arms equaling substantially 41 percent of the vehicle wheel base, the outside wheel diameter equaling substantially 43 percent of the vehicle wheel base, and said front wheel supporting arms being movable to substantially a vertical position in order to lift said blade to the height of a dump truck body for unloading said box.

9. In an earth moving vehicle, a main frame comprising a rigid cross member and longitudinal frame members extending rearwardly from said cross member, steering wheels supporting said longitudinal frame members, a power source mounted on said longitudinal frame members, a pair of front wheel supporting arms, said main frame including means at the ends of said cross member for mounting said arms, pivot means mounting said arms on said mounting means, means rigidly connecting said arms for simultaneous pivotal motion, traction wheels mounted on the forward ends of said arms, drive shafts mounted on said arms in axial alignment with the pivot axes of said arms, said drive shafts being mounted on said arms independently of the mounting of the pivot means for the arms on said main frame, said drive shafts extending laterally inwardly of said arms, drive connections between said drive shafts and said front traction wheels, drive means connected between said power source and said drive shafts, a scraper box rigidly mounted on said frame cross member and having a cutting blade, and power means arranged to pivot said front wheel supporting arms on said frame for raising and lowering the scraper box and frame assembly relative to the ground.

10. An earth moving vehicle comprising a main frame, rear wheels supporting the frame for earth traversing movement, a carrier box having rear, bottom and side plates providing a closed rear end portion of the box and converging in a lower rear corner of the box, means rigidly connecting said corner of the box to said frame, a pair of front wheel supporting arms pivotally connected directly to said main frame adjacent to said rear corner of the box, front wheels journalled on said arms, and power means for pivoting said arms relative to said frame for raising said frame and box about the axes of said rear wheels to a position with said bottom plate being forwardly upwardly inclined, being spaced above the uppermost portions of said front wheels, and projecting forwardly of said front wheels.

11. The vehicle of claim 10 including means extending beneath said bottom plate of the box and rigidly interconnecting said arms for simultaneous pivotal motion.

12. The vehicle of claim 10 including a power operated ejector plate slidably mounted in said box for movement toward and away from said rear plate, wherein said power means pivots said arms into substantially vertical positions when said bottom wall is upwardly inclined above said front wheels, and wherein said power means exerts pivoting force on said arms when the box is in said upwardly inclined position to hold the box in said position.

13. In an earth moving vehicle having a main frame and a carrier box fixedly mounted on said frame, the improvement comprising a pair of front wheel mounting arms, means for pivotally mounting said arms directly on the main frame, front wheels journalled on said arms, means for driving said front wheels, said driving means being supported on said arms independently of the pivotal mounting of said arms on said frame, and power means for pivoting said arms on said frame for raising said frame and box to a position wherein the forward portion of the box is at a height above the ground sufficient to unload said box into a truck body.

14. An earth moving vehicle comprising a main frame including a rigid cross member, longitudinal frame members extending rearward from said cross member, and outboard frame arms rigidly mounted on and extending forward from said cross member in outwardly spaced relation to said longitudinally members on opposite sides of said frame; rear wheels supporting said longitudinal members; stub shafts rigidly mounted on said outboard arms and extending inwardly therefrom; front wheel supporting arms having ball joint connections individually with said shafts and extending forward from said shafts; traction wheels mounted on the wheel supporting arms forwardly of said ball joint connections; a cross brace rigidly interconnecting said supporting arms for simultaneous pivotal motion thereof; drive shafts mounted on said supporting arms in general alignment with said shafts on their respective arms and extending inward from their arms; drive connections between said drive shafts and the front traction wheels on their respective supporting arms; drive means for imparting rotation to said drive shafts; a scraper box rigidly mounted on said cross member; and power means for pivoting said supporting arms on said outboard arms for raising and lowering the scraper box and main frame relative to the ground.

15. In an earth moving vehicle, a frame having a rear end portion mounted for earth traversing movement, a front end portion, and opposite sides; a scraper box rigidly mounted on said frame and extending forward with respect to said frame; stub shafts rigidly mounted on opposite sides of said frame and extending inward with respect thereto; a front wheel supporting arm having a ball joint connection with each stub shaft and extending forward from each shaft; traction wheels mounted on said wheel supporting arms foward of said shafts; a cross brace rigidly interconnecting said supporting arms for simultaneous pivotal motion thereof; drive shafts mounted on said supporting arms in substantial alignment with the stub shafts on the respective supporting arms, said drive shafts extending inward of said supporting arms with respect to said frame; drive connections between said drive shafts and said front traction wheels; drive means for imparting rotation to said drive shafts; and power means for pivoting said supporting arms on said frame for raising and lowering said box and frame relative to the ground.

16. An earth moving vehicle comprising a main frame including a rigid cross member, longitudinal frame members extending rearward from said cross member, and outboard frame arms rigidly mounted on said cross member and extending forward therefrom in outwardly spaced relation to said longitudinal members; rear wheels supporting said longitudinal members; front wheel supporting arms pivotally mounted on and extending forward from said outboard arms; front wheels mounted on said wheel supporting arms in forwardly spaced relation to their pivotal connections to said outboard arms; a scraper box rigidly mounted on said frame; brace arms rigidly mounted on said cross member and extending rearward and upward therefrom; upright supports interconnecting said longitudinal members and said brace arms rearwardly of said cross member; and longitudinally extendible and retractable power units pivotally interconnecting said brace arms and said supporting arms for pivoting said supporting arms on said outboard arms for raising and lowering said scraper box and frame relative to the ground.

17. In an earth moving vehicle, an elongated earth carrying box having a closed rear end portion, an open end portion and a bottom plate extending between said rear and front end portions and terminating in a lower front edge at the said front end portion; ground engaging means mounting the rear end portion of said box for elevational movement of said box about a rear axis extending transversely of said box, said box being movable between a lower position with said bottom plate sloping downward with respect to said rear axis and an upper position with said bottom plate sloping upward with respect to said rear axis; a pair of front wheels having peripheral surfaces circumscribing the axes of rotation of said front wheels; means supporting said box on said front wheels with their axes of rotation extending transversely of the box between the front and rear end portions thereof and for elevational movement of the box with respect to said wheels between said upper position wherein said bottom plate of the box is spaced above the upwardly disposed peripheral portions of said front wheels and said lower position wherein said bottom plate is spaced below said upwardly disposed peripheral portions, said front edge being spaced forward of the forwardly disposed peripheral portions of said front wheels in the upper position of the box; and powered means connected to said supporting means for moving said box into and between its upper and lower positions.

18. In an earth moving vehicle, a frame having front and rear end portions, a carrier box rigidly connected to said frame and having a bottom plate projecting forward from said frame, rear ground engaging wheels, means mounting the rear end portion of said frame on said rear wheels for rocking movement of said frame about the axes of said wheels between a lower position with said bottom plate forwardly declined and an upper position with said bottom plate upwardly inclined, pivot members mounted on said frame and providing pivot axes extending under said bottom plate in forwardly spaced generally parallel relation to said rear wheel axes, front ground engaging wheels, means individually mounting said front wheels on said pivot members for movement of the axis of each front wheel in an arc about its respective pivot axis, and powered means connected to said mounting means for imposing torque on said mounting means with respect to said pivot axes so as relatively to raise said pivot axes and lower said front wheel axes and thereby raise said bottom plate into its upper position and so as relatively to lower said pivot axes and raise said front wheel axes thereby to lower said bottom plate into its lower position.

19. In an earth moving vehicle, an elongated frame having front and rear end portions, rear ground wheels, means supporting the rear end portions of said frame on said rear wheels with their axes disposed transversely of the frame and for elevational movement of the frame about the axes of said rear wheels when said rear wheels are in ground engagement, front ground wheels, mounting means pivotally connected to the front end portion of said frame and rotatably supporting said front wheels in transversely spaced relation to each other with their axes extending transversely of said frame, said front wheels thereby having upper peripheral surfaces above their axes, said mounting means mounting said front wheels for elevational movement about pivot axes which are intermediate and generally parallel to the axes of the front and rear wheels, a carrier box secured to said frame and having a bottom plate forwardly projecting between said front wheels, said box being elevationally movable with said frame, and power means interconnecting said frame and said mounting means for imposing torque on said mounting means so as to raise said pivot axes relative to said front wheel axes and thereby lift said bottom plate above the upper peripheral surfaces of said front wheels and so as to lower said pivot axes relative to said front wheel axes thereby to lower said bottom plate below said peripheral surfaces.

20. In an earth moving vehicle, an elongated main frame having front and rear end portions; rear ground wheels; means supporting the rear end portion of the frame on said rear wheels with their axes disposed transversely of the frame and for elevational movement of the frame about the axes of the rear wheels when said rear wheels are in ground engagement; a carrier box secured to said frame and having a bottom plate forwardly projecting between said front wheels, said box being elevationally movable with said main frame; an auxiliary frame extending under said bottom plate and having opposite sides pivotally connected to said frame for pivotal movement of said auxiliary frame about pivot axes extending transversely of said frame and beneath said bottom plate, crank portions spaced outward from opposite sides of said box and projecting upward from said pivot axes, and wheel supporting portions projecting forward from said pivot axes; front wheels journalled on said wheel supporting portions; and fluid operated power units mounted on said frame and individually pivotally connected to said crank portions for imparting turning force to said auxiliary frame with respect to said pivot axes so as to raise said pivot axes and thereby raise said bottom plate to its upper position where it is spaced above said front wheels, so as to retain said bottom plate in its upper position, and so as to enable controlled lowering of said plate to its lower position.

21. In an earth moving vehicle; a frame including longitudinal frame members having front and rear end portions, a lower front cross member rigidly interconnecting said front end portions, an upper rear cross member, means connecting said rear cross member to said rear end portions in vertically spaced parallel relation to said front cross member, and side frame members rigidly interconnecting said cross members, said side members being spaced outward from said longitudinal members and extending forward from said front cross member; a carrier box rigidly supported on said frame and projecting forward from said front cross member between said side members; rear wheels having axes of rotation and supporting the rear end portions of said longitudinal frame members; transversely spaced mounting members having angularly related crank portions and wheel supporting portions; means individually connecting said mounting members to said side frame members intermediate said crank and supporting portions for pivotal movement of said members about transverse axes, said transverse axes being in forwardly spaced generally parallel relation to said front cross member, each mounting member being pivotable between a first position where in said supporting and crank portions respectively project forward and upward from their transverse axis and a second position wherein said supporting portion projects substantially vertically downward, and said crank portion projects forward, from their transverse axis; means rigidly interconnecting said mounting members for unitary movement; front wheels mounted on said supporting portions; and powered means individually pivotally interconnecting said crank portions and said upper cross member on opposite sides of said frame for pivoting said mounting members between their first and second positions whereby said frame is rocked back and forth on the axes of said rear wheels between a lower position with said transverse axes below said rear cross member and an upper position with said transverse axes at substantially the same elevation as said rear cross member.

22. In an apparatus for moving earth and similar materials, in combination, a supporting frame comprising front and rear parts pivotally interconnected along a horizontal transverse axis, transversely spaced ground engaging wheels supporting each of said parts, a material receiving bucket, means mounting said bucket on said frame intermediate the wheels of one of said parts and having an open end distant from said axis and extending beyond one end of said frame and a closed end adjacent said axis, means for moving said bucket between a lower material receiving position and an upper material discharging position wherein said bucket is inclined upwardly and said open end is spaced above the peripheries of said wheels, said means including power means interconnecting said parts and operable to pivot said parts about said axis to jacknife the frame whereby said front wheels and said rear wheels will be moved closer together and said bucket inclined upwardly to said upper material discharging position, ejector means slidably mounted in said bucket, and power means connected to the ejector for driving the same.

References Cited by the Examiner

UNITED STATES PATENTS

| 2,052,182 | 8/1936 | Le Bleu | 37—126 |
| 2,091,509 | 8/1937 | Kramer | 180—72 |
| 2,396,287 | 3/1946 | Robb. | |
| 2,425,664 | 8/1947 | Zakel | 37—126 |
| 2,540,100 | 2/1951 | Coeur | 280—43.23 |
| 2,679,119 | 5/1954 | Robb. | |
| 2,795,872 | 6/1957 | Wardle. | |
| 2,808,017 | 10/1957 | Killebrew | 37—17.5 |

FOREIGN PATENTS

| 160,159 | 4/1905 | Germany. |

ABRAHAM G. STONE, *Primary Examiner.*

R. M. DOUGLAS, BENJAMIN HERSH, J. A. MANIAN, M. KAUFMAN, ROBERT C. RIORDON, *Examiners.*

WILLIAM A. SMITH III, A. J. BECK, W. B. STONE, *Assistant Examiners.*